Oct. 20, 1964  G. W. ONKSEN ETAL  3,153,741
VEHICLE HEADLAMP FILAMENT SHIELD
Filed July 8, 1960

INVENTORS
George W. Onksen &
BY Clinton D. Hartzell

ATTORNEY

United States Patent Office 3,153,741
Patented Oct. 20, 1964

3,153,741
VEHICLE HEADLAMP FILAMENT SHIELD
George W. Onksen and Clinton D. Hartzell, Anderson, Ind., assignors to General Motors Corporation, Detroit, Mich., a corporation of Delaware
Filed July 8, 1960, Ser. No. 41,511
7 Claims. (Cl. 313—117)

The present invention relates to vehicle headlamps having two filaments which are adapted to be energized selectively to produce either a high or road beam or a low or depressed passing beam and, in particular, to a shield for intercepting certain glare-producing light rays directed forwardly from the lower beam filament both above and below a horizontal plane approximately through the filament.

Conventional automobile headlamps currently in use today typically comprise an all-glass concave or generally paraboloidal reflector and dihed cover glass or lens having their mating peripheries fused together to form a sealed envelope enclosing two filaments adapted to be energized selectively to provide a high or low beam. Each of the filaments is axially coiled and fixedly mounted within the lamp envelope with its major axis generally horizontal and parallel to the axis of the other filament. Moreover, these filaments are positioned in a predetermined position with respect to each other and the focus of the reflector depending upon the particular type of lamp in question.

For example, in one type of automobile headlamp presently in use, the upper beam filament is disposed horizontally within the reflector and is located approximately at the focus of the reflector, while the lower beam filament is located slightly above and to one side of the upper beam filament. In another type of headlamp, commonly referred to as a Type II lamp, the horizontally disposed lower beam filament is located approximately at the focus of the reflector, while the upper beam filament is located slightly below and to one side of the lower beam filament. In passing, it might be noted that one variety of such a Type II lamp is known as a 7-inch lamp because of its diameter, and is employed in a single lamp installation on each side of the front of the vehicle. Another variety of such Type II lamp is known as the 5¾-inch lamp, and is utilized in dual lamp installations on each side of the front of the vehicle.

Irrespective of the particular type of headlamp involved, the dual filaments of a given lamp are adapted to be energized selectively to provide either a high symmetrical road beam suitable for country driving purposes, or a low or depressed asymmetric beam suitable for use when passing other vehicles. To this end, the lamp lens is provided with suitable light-distributing media such as light-spreading flutes and vertically up-bending and down-bending prisms to provide the aforementioned road and passing beams meeting specifications as set therefor by the motor vehicle industry. However, because of the particular character of such light-distributing media, and particularly the vertically up-bending and down-bending prisms, a problem is presented with respect to an appreciable amount of upward and downward spill light which is unavoidably produced from the lower beam filament of the headlamp. Such spill light becomes an annoying and sometimes blinding glare when reflected into the eyes of the vehicle operator by fog, snow, rain, dust and the like, or directed into the eyes of the operator of an oncoming vehicle.

At this juncture, it should be noted that such spill or glare light may be occasioned not only by light rays directed upwardly from the filament, but also from direct light rays which pass forwardly and downwardly through the lens and are refracted downwardly further by the light-distributing media on the lens so as to strike highly polished surfaces protruding forwardly from the plane of the headlamps, sush as chrome-coated bumpers and trim. As a consequence, such direct downward filament light is redirected upwardly by such highly polished surfaces. As a result, the problem of upward spill or glare light may be occasioned by light rays passing forwardly from the lower beam filament both above and below a horizontal plane approximately through the filament.

One solution to this problem is offered by the construction disclosed in the copending application of Howard C. Mead, S.N. 39,643, filed June 29, 1960, which is now U.S. Patent 3,020,435, granted February 6, 1962, which construction comprises a light-intercepting shield disposed immediately in front of the lamp filaments and having spaced upper and lower shield sections in predetermined positions with respect to the lower beam filament so as to intercept a substantial portion, but not all, of the light rays directed forwardly from the lower beam filament both above and below a horizontal plane approximately through the filament. The upper and lower shield sections are joined by an integral generally centrally located bridge or neck which defines in conjunction with the opposed edges of the upper and lower shield sections, generally horizontal openings or notches to either side of the bridging neck to permit passage through the shield of certain remaining and selected light rays which are available for lighting the side of the roadway, street signs and the like, while not resulting in any objectionable glare. The present invention is directed to an improvement in the construction of the Mead application aforementioned in that the present shield is so constructed and arranged as to intercept annoying glare-producing light rays both above and below a horizontal plane approximately through the lower beam filament, while increasing the light available for lighting the side of the roadway, street signs and the like while not resulting in any objectionable glare therefrom.

Therefore, it is a principal object and feature of this invention to provide an improved shield for a filament of a headlamp to render the latter substantially free of upward spill or glare light emanating directly from the lower beam filament both above and below a horizontal plane approximately through the filament.

It is yet another object and feature of this invention to provide a filament shield of the type aforementioned which, while intercepting direct light rays projected forwardly from a filament both above and below a horizontal plane generally through the filament, still permits passage of certain relatively unobjectionable light rays which are then available for side-lighting or lighting areas generally to either side of the path of the vehicle.

It is yet another object and feature of this invention to provide a filament shield of the type aforementioned which is characterized by vertically spaced upper and lower shield sections employed, respectively, for intercepting glare-producing light rays projected forwardly from the lower beam filament above and below a horizontal plane approximately therethrough, and which shield sections are mounted in vertically spaced relation by an annular or circular flange or band joining the peripheries of the shield sections whereby the central portion of the shield may be left substantially entirely open to permit light rays to pass therethrough for cooperation with the light-spreading flutes of the lens for side lighting purposes, in addition to sidewardly directed direct filament light passing through the periphery of the lens.

It is yet another object and feature of this invention to provide an improved filament shield for a headlamp of the dual filament type in which upper and lower shield sections intercept glare-producing light rays as afore-described, while the central portion of the shield between the shield sections is generally entirely open, thereby not only providing additional light rays from the lower beam filament for side lighting purposes, but also providing more efficient lighting from the upper beam filament disposed substantially in such opening.

In general, these and other objects of this invention are attained in a headlamp construction of the type comprising two vertically spaced laterally offset generally horizontally disposed coiled filaments adapted to be selectively energized to produce either a high or low beam of the required characteristics, and a light-intercepting shield disposed immediately in front of the filaments and having spaced upper and lower sections in predetermined positions with respect to the filaments so as to intercept a substantial portion, but not all, of the light rays directed forwardly from the lower beam filament both above and below a horizontal plane approximately through the filament. The respective shield sections are mounted in the aforementioned spaced relation by means of an annular or circular band joining the peripheries of the shield sections to define with the latter an opening generally centrally of the shield permitting certain remaining and selected light rays from the lower beam filament, which are available for lighting the side of the roadway, street signs and the like, to pass through the shield and the periphery of the lens and, also, through the center of the lens which is provided in the usual manner with light-spreading flutes for side lighting purposes. The aforementioned annular or circular band joining the shield sections is generally aligned between the lower beam filament and the fused peripheral juncture of the reflector and lens to minimize interception of direct light from the lower beam filament which is available for side lighting purposes. Additionally, the lower shield section is displaced axially forwardly of the upper shield section and is so related with respect to the lower beam filament as to additionally enhance its intercepting function with respect to direct light rays from the lower beam filament below the horizontal plane, and is so located with respect to the upper beam filament whereby a major portion of the latter is relatively unshielded for lighting purposes. In this regard, this relationship is relatively important in a lamp of the Type II variety aforementioned which is utilized in single installations in which the upper beam filament is the only source of available light for upper beam illumination.

The manner in which the foregoing objects are attained will become more apparent hereinafter as the description of the invention proceeds, and in which reference is made to the following drawings in which.

Figure 2:
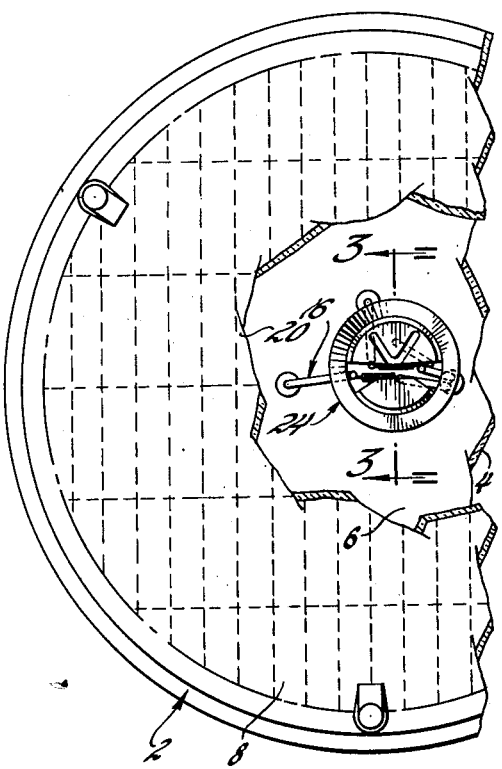
FIGURE 2 is a fragmentary front elevation of the headlamp of FIGURE 1, with certain parts broken away to illustrate certain details of the invention.

Referring now to the drawings, the numeral 2 indicates an all-glass sealed beam lamp comprising a concave or generally paraboloidal reflector 4 having a suitable reflective coating on its inner surface 6, and a dish-shaped lens 8. The peripheral rims of the lens and reflector are fused together as indicated at 10 to form a sealed envelope for the dual sources of concentrated light in the form of an axially coiled generally horizontally disposed lower beam filament 12 and similarly formed and disposed upper beam filament 14. As is the usual practice, the two coiled filaments are suspended within the lamp envelope on the inner ends of a suitable number of lead wires, indicated generally at 16, which extend through the base of the reflector 4 and are electrically and mechanically connected to the contact structures 18 accessible from the exterior of the reflector. Inasmuch as the lamp illustrated is of the Type II variety, the lower beam filament 12 is located approximately at the focus of the reflector, although not necessarily exactly centered laterally thereon. The upper beam filament 14 is located slightly below and offset to the left from the lower beam filament 12 as viewed in FIGS. 2 and 4.

Figure 1:
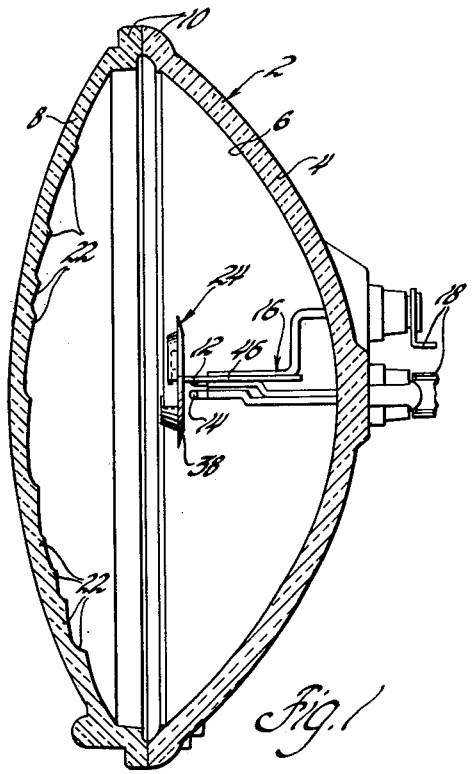
FIGURE 1 is a vertical section through a modern vehicle headlamp equipped with the invention.

The light-distributing lens 8 of the headlamp is provided in the usual manner with suitable light-distributing media, preferably on the inner surface of the lens, for distuributing the rays of light projected from the reflecting surface 6 so as to produce, upon selective energization of the filaments 12 and 14, a lower driving beam and an upper passing beam conforming to the specifications set therefor by the motor vehicle industry. For this purpose, and according to conventional practice, the lens 8 is divided into a series of sections or "patches" which are provided as required with a plurality of small light-spreading flutes for horizontally spreading the light passing through the lens. As is well known in the art, certain of such flutes in different portions of the lens provide different degrees of spread in order to impart the required horizontal spread to the beams projected by the lamp. In any event, the numeral 20 indicates certain of these light-spreading flutes concentrated generally centrally of the lens. Furthermore, certain of the sections or "patches" of the lens are provided with vertically up-bending and down-bending prisms indicated at 22 in FIGURE 1 so as to refract the light rays passing therethrough to provide the required vertical distribution of the light in the beams projected by the lamp.

In the manufacture of lenses provided with such vertically up-bending and down-bending prisms 22, the ends or extremities of the prisms must be provided with a slight amount of draft in order to permit separation of the lens from the pressing plunger of the molding apparatus. As is well known in the art, the bases of such prisms have rounded corners which constitute, in conjunction with the base surface itself, small secondary lenses which direct the rays of light striking it in a direction opposite to that of the rays refracted by the prism itself. These corners of the aforementioned down-bending prisms, as well as the base surfaces thereof, direct the rays of light striking them upward from the headlamp. Consequently, these corners and base surfaces of the down-bending prisms constitute sources of light in the lens itself which create a considerable amount of upward spill and glare light which, when added to the upward direct light from the lower beam filament 12, creates an upwardly directed curtain of spill and glare light from the headlamp. In similar fashion, such corners and base surfaces of the up-bending prisms constitute secondary sources of light in the lens itself which create a considerable amount of downward spill light which is or can be reflected from highly reflective portions of the vehicle protruding in front of the headlamps, such as the front bumper, so as to be directed upwardly to provide an additional source of glare light.

In order to reduce, although not eliminate, this problem of glare at least with respect to light from the lower beam filament directed forwardly therefrom and above a horizontal plane, it is common practice to tilt the axis of the paraboloidal reflecting surface 6 downwardly at a slight angle from the horizontal, and also to the right a few degrees when viewed from behind the reflector. Such an expedient aids in properly directing the lower beam projected from the filament 12 down and to the right when viewed from the vehicle operator's compartment, although the light-distributing media aforedescribed is still required to complete distribution of the desired lower beam as well as the upper beam. However, by so tilting the reflector axis relative to the horizontal, and as is well known in the art, the glare effect from the direct upward spill light from the lower beam filament is to some extent minimized, although far from eliminated.

Having described a conventional and well known lamp construction and the glare problem produced thereby, reference will now be made to the filament shield 24, which not only substantially eliminates the problem of glare from direct upward spill light from the filament 12, but also the similar problem occasioned by downward spill light which is susceptible to refraction by the draft corners and bases of the vertically up-bending prisms so as to be directed toward and re-reflected upwardly from highly polished surfaces on the vehicle protruding forwardly from the lamp.

Figure 3:
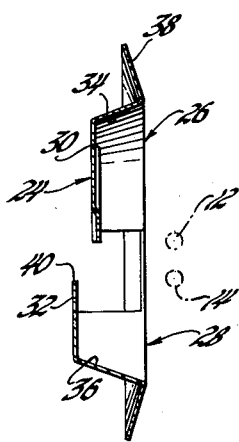
FIGURE 3 is an enlarged section taken on line 3—3 of FIGURE 2.
Figure 4:
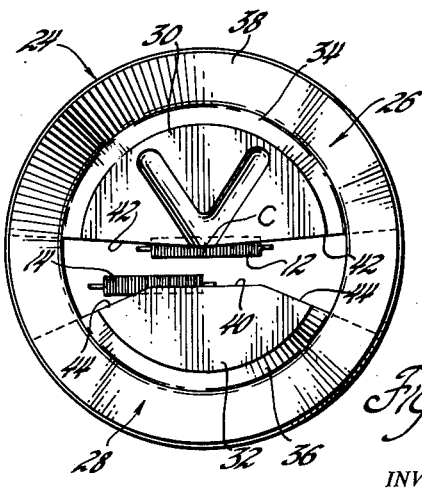
FIGURE 4 is an enlarged plan view of the filament shield of FIGURE 2.

Referring particularly to FIGS. 3 and 4, the filament shield 24 may be seen to have a generally circular configuration in that it comprises vertically spaced upper and lower shield sections 26 and 28, respectively, each of which includes a vertical base wall 30 and 32, and an integral side wall or peripheral edge 34 and 36 projecting radially and axially rearwardly therefrom. The shield sections are joined by a relatively narrow circular band or flange 38 formed integral with side walls 34 and 36 and extending radially and slightly axially forward from the geenral plane of the shield. More specifically, the upper shield section 26 has the shape of a 170° sector of a circle, while the lower shield section 28 is in the form of a 120° sector of the same circle from which the upper shield section is sectorized, the lower shield section sector being truncated horizontally at 40. The circular band 38 rigidly joins and vertically spaces the upper and lower shield sections from each other so as to form an opening through the shield defined by the spaced shield sections and the segments of the band enclosed within dotted lines in FIG. 4. It will be noted that these dotted lines form extensions of the radial edges 42 and 44, respectively, of the upper and lower shield sections 26 and 28. Moreover, vertical wall 32 of the lower shield section is displaced axially forward of the wall 30 of the upper shield section.

The apex of the sector-shaped upper shield section 26 is disposed at the center "C" of the shield, while the upper shield section is symmetrically disposed on either side of a vertical plane through the center so that the radial edges 42 thereof extend upwardly at an angle of approximately 5° with the horizontal. In similar fashion, the lower shield section 28 is symmetrically disposed with respect to the aforementioned vertical plane with the radial edges 44 thereof extending downwardly at an angle of approximately 30° with the horizontal. Thus, as will appear more fully hereinafter, the opening in the shield formed by the band or flange 38 and the spaced shield sections will permit direct light to pass from the lower beam filament 12 slightly above and to a greater extent below a horizontal plane approximately through the center "C" of the shield.

A wire 46 is suitably secured to the upper shield section and to one of the lead wires so as to mount the shield 24 immediately in front of the filaments 12 and 14. More specifically, and referring again particularly to FIG. 4, the shield is preferably positioned so that a vertical plane through the center "C" thereof passes approximately through the mid-point of lower beam filament 12, while a horizontal plane through the center "C" of the shield approximately contains the coil axis of the filament. The upper beam filament 14 is correspondingly located just to the left of the aforementioned vertical plane through the shield center "C" when viewed in FIG. 4 with the coil axis of the filament just slightly above the truncated edge 40 of the lower shield section. Moreover, the left end of the upper beam filament as viewed in FIG. 4 is entirely exposed between the radial edges 42 and 44 of the upper and lower shield sections. It will also be noted from FIG. 3 that the lower shield section is displaced axially forwardly from the plane of the upper shield section so as to intercept a greater amount of light rays emanating directly from the lower beam filament than would be the case if the lower shield section were disposed in the same plane as the upper shield section. Finally, and referring particularly to FIG. 1, it will be noted that the plane of the circular band 38 is generally aligned between the lower beam filament 12 and the circular fused juncture 10 between the lamp lens and reflector, which juncture does not include optical media or otherwise contribute to the light beams desired. Thus, the band 38 is so located relative to the lower beam filament 12 as to minimize the amount of direct light intercepted from the latter in the areas bounded by the dotted lines illustrated in FIG. 4, so that a maximum amount of light in this area will be available for side-lighting purposes. At the same time, what little light is intercepted by the annular band in this area is unusable, anyway, inasmuch as it will strike the non-optic portion of the lamp comprised of the fused juncture 10.

From the foregoing description, it may be seen that with the lower beam filament 12 energized, the upper shield section 26 will intercept substantially all glare-producing light rays directed forwardly and above a horizontal plane generally through the center of the shield or the coil axis of the lower beam filament; that is, the upper shield section will intercept such direct light rays in the solid angle sub-tended by approximately 170° of the upper half of the lens 8 above the aforementioned plane. In similar fashion, the lower shield section 28 will intercept glare-producing light rays directed forwardly from the lower beam filament below the horizontal plane aforementioned, and in the angle sub-tended by approximately 120° of the lower half of the lamp lens 8. On the other hand, the opening formed between the opposed shield sections permits direct light rays from the lower beam filament 12 to pass therethrough and through peripheral portions of the lens toward either side of the vehicle for side-lighting purposes and, while consisting substantially of light below the aforementioned horizontal plane, some light passes above said plane for illuminating signs and the like along the roadway. In this regard, light passing through the opening generally opposite the truncated edge 40 of the lower shield section will strike the light-spreading flutes 20 located generally centrally of the lens, and be refracted laterally thereby contributing further light for such side-lighting purposes. Additionally, the displaced relationship of the lower shield section 28 relative to the upper shield section 26, and the relationship of the circular band 38 to the lower beam filament 12 and juncture 10, each contribute, respectively to interception of a relatively great proportion of objectionable light directed downwardly below the aforementioned horizontal plane, and non-interception of a majority of the usable non-objectionable light passing the sections of the band 38 enclosed between the dotted lines indicated in FIG. 4.

It will also be noted from FIG. 4 that the upper beam filament 14 is relatively exposed inasmuch as the center of the shield is open. Such a relationship is particularly significant in single lamp installations in which the upper beam filament is the only source of upper beam light, and therefore must provide all of the upper beam including the side light.

From the foregoing description, it may be seen that the filament shield 24 is constructed and arranged relative to lower beam filament 12 and the lens 8 so as to intercept glare-producing light rays directed forwardly from the filament both above and below the horizontal to prevent corresponding critical areas of the lens from a glare-producing standpoint from receiving any such rays, while at the same time permitting unobjectionable direct light rays to pass through the opening in the shield for lighting the side of the roadway. Viewed in another way, an area on the inner surface of the lens 8 corresponding to the configuration of the shield 24 in FIG. 4 is masked from any such objectionable direct rays from the filament 12, while a generally centrally located portion of the lens is unmasked and will receive, transmit and spread direct light rays from the lower beam filament for side-lighting purposes.

While but one form of the invention has been shown and described, other forms will now be apparent to those skilled in the art. Therefore, the embodiments shown in the drawings is merely for illustrative purposes, and is not intended to limit the scope of the invention which is defined by the claims which follow.

We claim:

1. A shield for fixedly mounting in a vehicle headlamp immediately in front of a coiled filament disposed in a substantially horizontal plane therein for intercepting certain glare-producing light rays directed forwardly from said filament above and below said plane, said shield comprising an upper shield section disposable above said horizontal plane to intercept certain glare-producing light rays from said filament directed forwardly therefrom above said horizontal plane, a lower shield section disposable below said horizontal plane and axially forwardly of said upper shield section to intercept certain glare-producing light rays from said filament directed forwardly therefrom below said horizontal plane, and means joining said shield sections in vertically spaced relation to define a generally central opening in said shield between said sections to permit passage therethrough of selected direct light rays from said filament.

2. A shield for fixedly mounting in a vehicle headlamp immediately in front of a coiled filament disposed in a substantially horizontal plane therein for intercepting certain glare-producing light rays directed forwardly from said filament above and below said plane, said shield comprising an upper shield section having the shape of a sector of a circle and disposable above said horizontal plane to intercept certain glare-producing light rays from said filament directed forwardly therefrom above said horizontal plane, a lower shield section having the shape of a truncated sector of said circle and being disposable below said horizontal plane and axially forwardly of said upper shield section to intercept certain glare-producing light rays from said filament directed forwardly therefrom below said horizontal plane, and a circular band having its center at the center of said circle and formed integral with the arcuate peripheral edges of said shield sections, said band joining said shield sections in vertically spaced relation to define an opening in said shield between said sections and band to permit passage therethrough of selected direct light rays from said filament.

3. A shield for fixedly mounting in a vehicle headlamp immediately in front of a coiled filament disopsed in a substantially horizontal plane therein for intercepting certain glare-producing light rays directed forwardly from said filament above and below said plane, said shield comprising an upper shield section having the shape of a 170° sector of a circle and disposable above said horizontal plane to intercept certain glare-producing light rays from said filament directed forwardly therefrom above said plane, a lower shield section having the shape of a truncated 120° sector of said circle and being disposable below said horizontal plane to intercept certain glare-producing light rays from said filament directed forwardly therefrom below said plane, the truncated portion of said lower shield section being displaced axially forward of said upper shield section, and a circular band having a center of curvature at the center of said circle and formed integral with the arcuate peripheral edges of said shield sections, said band joining said shield sections in vertically spaced relation to define an opening in said shield between said sections and band to permit passage therethrough of slected direct light rays from said filament.

4. In a vehicle headlamp comprising a substantially paraboloidal reflector, a filament mounted in front of said reflector in a substantially horizontal plane, a lens covering said reflector and provided with vertically up-bending and down-bending prisms and generally centrally located light-spreading flutes for distributing light rays reflected by said reflector upon energization of said filament, and a fused juncture between the peripheries of said reflector and lens, the improvement consisting of a filament shield mounted immediately in front of said filament and comprising an upper shield section having the shape of a sector of a circle and disposed substantially entirely above said horizontal plane to intercept certain glare-producing lights rays from said filament directed forwardly therefrom above said plane, a lower shield section having the the shape of a truncated sector of said circle and being disposed substantially entirely below said horizontal plane to intercept certain glare-producing light rays from said filament directed forwardly therefrom below said plane, and a circular band having its center at the center of said circle and formed integral with the arcuate peripheral edges of said shield sections to join said shield sections in vertically spaced relation to define an opening in said shield between said shield sections and band to permit passage therethrough of selected light rays from said filament directed toward the unshielded portions of said lens including said light-spreading flutes, said band being generally aligned between said filament and said fused juncture whereby a minimum of usable direct light from said filament is intercepted by said band between said shield sections.

5. In a vehicle headlamp comprising a substantially paraboloidal reflector, a filament mounted in front of said reflector in a substantially horizontal plane, a lens covering said reflector and provided with vertically up-bending and down-bending prisms and generally centrally located light-spreading flutes for distributing light rays reflected by said reflector upon energization of said filament, and a fused juncture between the peripheries of said reflector and lens, the improvement consisting of a filament shield mounted immediately in front of said filament and comprising an upper shield section having the shape of a sector of a circle and disposed substantially entirely above said horizontal plane to intercept certain glare-producing light rays from said filament directed forwardly therefrom above said plane, a lower shield section having the shape of a truncated sector of said circle and being disposed substantially entirely below said horizontal plane to intercept certain glare-producing light rays from said first filament directed forwardly therefrom below said plane, said lower shield section being displaced axially forward of said upper shield section, and a circular band having its center at the center of said circle and formed integral with the arcuate peripheral edges of said shield sections to join said shield sections in vertically spaced relation to define an opening in said shield between said shield sections and band to permit passage therethrough of selected light rays from said filament directed toward the unshielded portions of said lens including said light-spreading flutes, said band being generally aligned between said filament and said fused juncture whereby a minimum of usable direct light from said filamnt is intercepted by said band between said shield sections.

6. The structure as defined in claim 4 in which said filament is a lower beam filament, and further comprising a substantially horizontal upper beam filament mounted below said lower beam filament and having a substantial portion thereof opposite said opening in said shield.

7. The structure as defined in claim 5 in which said filament is a lower beam filament, and further comprising a substantially horizontal upper beam filament mounted below said lower beam filament and having a substantial portion thereof opposite said opening in said shield.

References Cited in the file of this patent

UNITED STATES PATENTS

| | | |
|---|---|---|
| 1,998,967 | Raynolds | Apr. 23, 1935 |
| 2,880,347 | Flaws et al. | Mar. 31, 1959 |